Patented June 14, 1938

2,120,572

UNITED STATES PATENT OFFICE 2,120,572

PROCESS AND PRODUCT FOR OBTAINING RAPID COAGULATION OF RUBBER

Manlio Mosca Riatel, Turin, Italy, assignor to Cela Holding S. A., Paris, France, a corporation of France No Drawing. Application September 15, 1936, Serial No. 100,957. In France September 20, 1935

5 Claims. (Cl. 18—50)

It is very often desired to obtain as rapidly as possible a coagulation of the rubber contained in suspension or dispersion, natural or artificial, whatever its source. This is especially the case when porous bodies of vegetable, animal or mineral material, are impregnated with such solutions or dispersions, and more particularly when there are concerned textile goods impregnated with natural, synthetic, regenerated or recovered rubber.

This problem becomes of specially great importance when a bath of rubber preparation is given a high degree of fluidity, for example in order to facilitate impregnation; coagulation then becomes still more difficult.

In order to accelerate the process of coagulation of rubber there is often employed a volatile acid, for example acetic acid, but the operation is nevertheless long in many cases, particularly on account of the relatively slow diffusion of the acid in the mass of the rubber or in the body impregnated therewith.

The present invention has for its object a preparation which will render it possible to obtain in every case a rapid coagulation of the rubber especially of the rubber latex, and which contains at the same time elements which promote vulcanization of the rubber. The invention provides advantageously for employing these elements, especially in the case of impregnation, in a form which so far from being unfavorable to this impregnation, will improve it by the effect which will be produced upon the properties of penetration of the rubber into the porous body to be impregnated, especially by augmenting the fluidity of the bath for a given concentration of rubber.

The preparation according to the invention for coagulating and vulcanizing latex is obtained by dissolving in ammonia a salt of zinc with a volatile weak acid, for example zinc acetate, and adding to this solution a solution of colloidal sulphur obtained by reaction between a solution of sulphur dioxide with an ammonium polysulphide in the presence of an ammoniacal solution of casein and of formaldehyde.

Accelerators, plasticizers, anti-oxidizing agents and the like may, if desired, be added to the preparation.

The colloidal product obtained has the property of being able to be added in whatever proportion may be desired to a bath of latex of any concentration and from any source (natural, regenerated, synthetic, etc.).

The ammonium acetate which is formed in this preparation has the remarkable property of conducing to an acceleration of the coagulation of the rubber during the period of drying which follows the formation of the rubber mass or the impregnation of porous bodies by the bath containing the product according to the invention. In fact during the drying period, due to the evaporation of the ammonia, the ammonium acetate manifests a weak acidity which begins to precipitate the casein. At the same time the hexamethylene tetramine formed in the preparation by action between the ammonia and formaldehyde is split up, and the formaldehyde set free contributes to cause precipitation of the casein, and the latter in turn causes the uniform coagulation of the rubber, said coagulation becoming progressively more active and complete as the ammonia evaporates and the acidity increases.

After about half an hour of drying in the air the mass of rubber or the impregnated body can be calendered or rolled in order to eliminate water. There is thus achieved considerable economy of drying vapour, and moreover an improvement in the finished product. In fact the rubber which has been subjected to calendering in a state of great plasticity has its compactness and cohesion augmented, and this increases its resistance and its elasticity.

If it is desired to slow down the rapidity of coagulation there can be added a higher proportion of ammonia.

In general therefore it is possible to accelerate as desired the time of coagulation of the rubber but always controlling the rapidity of this coagulation.

The following is an example of carrying the invention into effect, but the invention is not limited thereby:

A solution A is first prepared by dissolving 5 grams of zinc acetate in 5 grams of ammonia of a density of 0.888.

A solution B is formed by adding 4 cubic centimetres of a 10% aqueous casein solution to 1 cubic centimetre of 40% formaldehyde heated to 60° C. and the mixture is stirred until a clear solution is obtained. It is then allowed to cool. There is then added to this solution B 13 cubic centimetres of an aqueous solution of sulphur dioxide at 4° Bé. There may be added if desired in order to increase the stability of the sulphur dioxide solution 0.5% of glycerine. To the solution B thus obtained 7 cubic centimetres of 30% ammonium polysulphide are added and stirring is performed until all flocculation has disappeared, which had occurred by adding the sulphur dioxide solution to the casein formaldehyde compound.

There is then produced a solution C by adding the solution A to the solution B, and then there is added to the new solution thus obtained the other body or bodies, i. e. accelerators, plasticizers, anti-oxidizing agents, etc.

The solution C is mixed with 166 grams of latex of 60% concentration and a solution is obtained which gives about 40% of dry rubber. It will be understood that this solution C can be diluted by adding water. Also one may obtain a more diluted solution by using a less concentrated latex.

The complete solution obtained as has just been described is particularly suitable for impregnating various kinds of textiles or for making various rubber bodies.

I claim:

1. A process for obtaining a self coagulating and vulcanizable bath of latex which consists in dissolving in an aqueous solution of ammonia a zinc salt of a volatile weak acid, reacting a solution of sulphur dioxide with an ammonium polysulphide in the presence of an ammoniacal solution of casein and formaldehyde, adding the product of this reaction to the solution of the zinc salt in ammonia, and incorporating the preparation thus obtained into a latex bath.

2. A process for obtaining a self coagulating and vulcanizable bath of latex which consists in dissolving zinc acetate in an aqueous solution of ammonia, reacting a solution of sulphur dioxide with an ammonium polysulphide in the presence of an ammoniacal solution of casein and formaldehyde, adding the product of this reaction to the solution of the zinc salt in ammonia, and incorporating the preparation thus obtained into a latex bath.

3. A self coagulating and vulcanizable bath of latex containing a zinc salt of a volatile weak acid in ammoniacal aqueous solution mixed with aqueous solution of colloidal sulphur containing casein and formaldehyde.

4. A self coagulating and vulcanizable bath of latex containing zinc acetate in ammoniacal aqueous solution mixed with an aqueous solution of colloidal sulphur containing casein and formaldehyde.

5. A process for obtaining a self coagulating and vulcanizable bath of latex which consists in dissolving 5 grams of zinc acetate in 5 grams of ammonia of density 0.888; forming a second solution by adding to 4 cubic centimeters of a 10% aqueous solution of casein 1 cubic centimeter of 40% formaldehyde heated to 60° C., stirring to clearness, then cooling and adding 13 cubic centimeters of sulphur dioxide in an aqueous solution at 4° Bé.; adding to the second solution thus obtained 7 cubic centimeters of 30% ammonium polysulphide and stirring until the disappearance of all flocculation; mixing the first solution with the second solution thus completed; and incorporating the preparation thus obtained into a latex bath.

MANLIO MOSCA RIATEL.